United States Patent [19]

Ohsuga et al.

[11] Patent Number: 4,850,219

[45] Date of Patent: Jul. 25, 1989

[54] METHOD AND APPARATUS FOR MEASURING THE QUANTITY OF INTAKE AIR BASED ON THE TEMPERATURE VARIATION CAUSED BY HEAT DISSIPATION

[75] Inventors: Minoru Ohsuga; Yoshishige Ohyama, both of Katsuta, Japan

[73] Assignee: Hitachi, Ltd., Tokyo, Japan

[21] Appl. No.: 238,142

[22] Filed: Aug. 30, 1988

[30] Foreign Application Priority Data

Sep. 2, 1987 [JP] Japan ................................ 62-217861

[51] Int. Cl.$^{4}$ ............................................ G01M 15/00

[52] U.S. Cl. ................................ 73/118.2; 73/204.17

[58] Field of Search ............. 73/118.2, 204.14, 204.17; 123/494; 364/431.03

[56] References Cited

U.S. PATENT DOCUMENTS 4,205,377 5/1980 Oyama et al. ................ 73/204.14 X 4,730,255 3/1988 Akiyama et al. .............. 73/118.2 X

FOREIGN PATENT DOCUMENTS 185639 8/1986 Japan .

*Primary Examiner*—Jerry W. Myracle

*Attorney, Agent, or Firm*—Antonelli, Terry & Wands

[57] ABSTRACT

A method and apparatus for measuring the quantity of intake air of an internal combustion engine in its suction stroke include the operating steps of: heating a thermal resistor element located in the intake air path for a certain duration in synchronism with the suction stroke, detecting the electrical signal, which represents the resistance variation of the resistor element, at the end of heating and at the beginning of next heating, obtaining a value, which corresponds to the temperature variation of the resistor element, from the detected two electrical signals, obtaining the heat conduction factor of air from the obtained value, and obtaining a quantity of intake air from the obtained heat conductor factor of air.

28 Claims, 11 Drawing Sheets

METHOD AND APPARATUS FOR MEASURING THE QUANTITY OF INTAKE AIR BASED ON THE TEMPERATURE VARIATION CAUSED BY HEAT DISSIPATION

BACKGROUND OF THE INVENTION

This invention relates to an air flow measuring apparatus for measuring the quantity of intake air to an internal combustion engine.

A conventional pulse-heating air flow measuring apparatus is designed to measure the air flow by heating a thermal resistor element intermittently and measuring the time until the resistor is cooled down by heat dissipation to a certain temperature, as described in Japanese Patent Unexamined Publication No. 61-185639 (filed on Feb. 12, 1985; laid-open on Aug. 19, 1986).

The air flow measuring apparatus of this type basis its operation on the detection of the resistor's temperature reaching a predetermined temperature, and therefore it necessitates a resistor for compensating the intake air temperature installed in the intake air path besides the thermal resistor element as a sensor for measuring the quantity of intake air.

SUMMARY OF THE INVENTION

An object of this invention is to provide a method and apparatus for measuring the quantity of intake air without using temperature compensation device such that the intake air temperature does not affect the measuring.

The invention resides in the air flow measuring apparatus comprising:

(a) a thermal resistor element located in the intake air path of the internal combustion engine, (b) means of heating the thermal resistor element at a certain time interval or at a certain crank shaft angle, and (c) measuring means which compares temperature information at substantially the end of heating of the thermal resistor element with temperature information at substantially the beginning of next heating, and produces an air quantity signal based on the comparison result.

In the above arrangement of apparatus, the thermal resistor element is cooled down by heat dissipation from a temperature at the end of heating to a temperature at the beginning of next heating, and the temperature variation between the two time points is detected as a value representing the air quantity.

The invention allows the evaluation of intake air quantity without being affected by the air temperature, eliminating the need of the conventional intake air temperature compensating resistor and associated circuitry, whereby the circuit arrangement is simplified.

DESCRIPTION OF THE PREFERRED EMBODIMENTS

First, the overall arrangement and, next, the principle of this invention will be explained.

Figure 3:
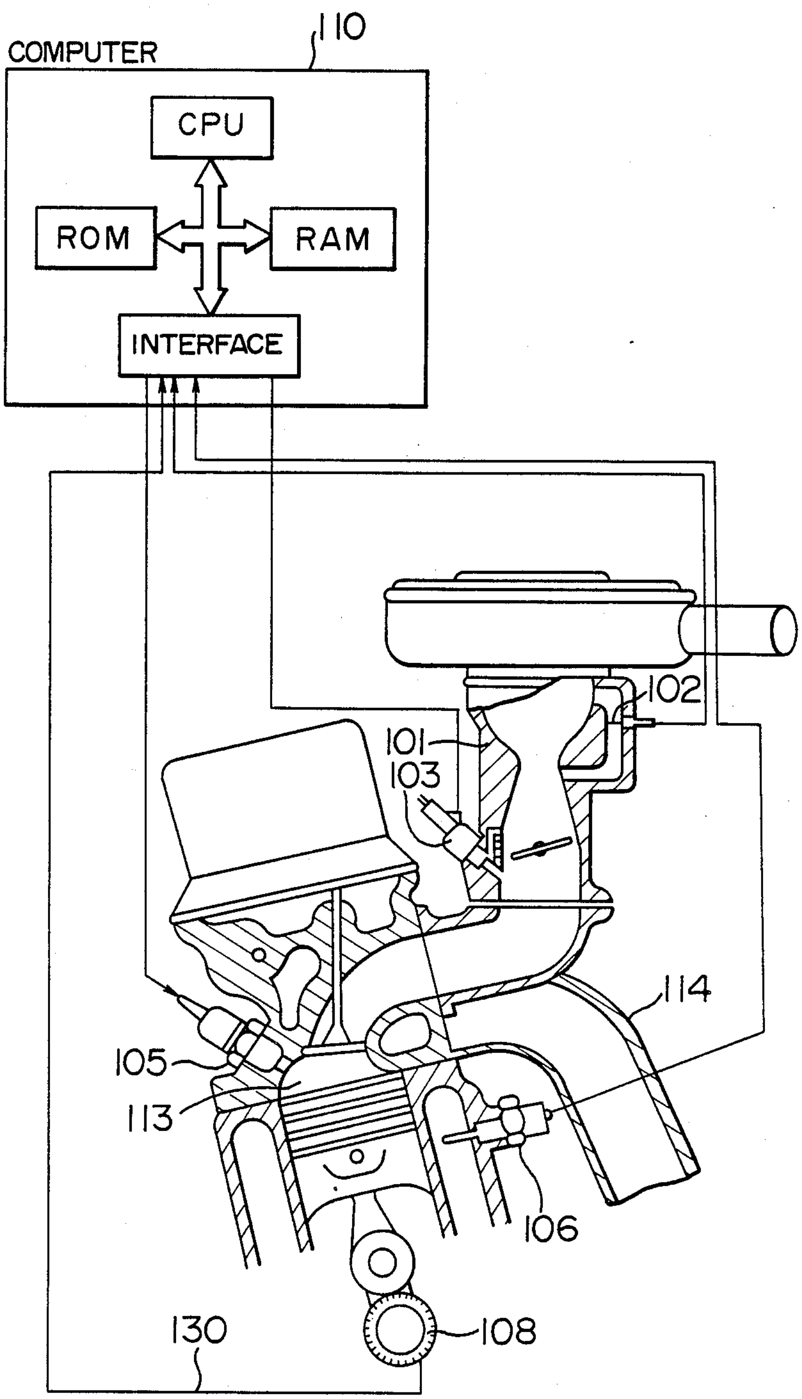
FIG. 3 is a diagram showing the overall arrangement of this invention.

FIG. 3 shows an electronically-controlled engine system, which includes an air flow sensor 102, an injector 103, an ignition plug 105, a coolant temperature sensor 106 and a crank angle sensor 108. A microcomputer 110 is used to control the mixing ratio of the mixture introduced to combustion chambers 113. The air flow sensor 102 of this invention is intended to measure the quantity of intake air, and is located in the air path within a sensor chamber 101. Indicated by 114 is an exhaust pipe.

Figure 4:
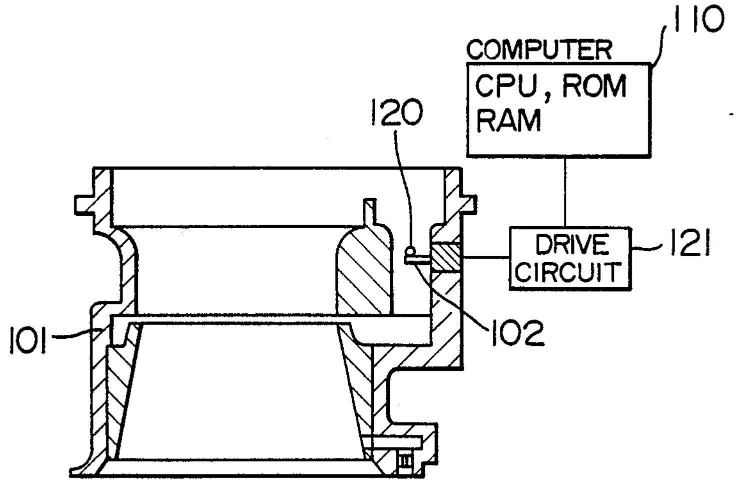
FIG. 4 is a cross-sectional view of the sensor chamber.

FIG. 4 is a cross-sectional view of the sensor chamber 101, in which the sensor 102 is disposed where the intake air flows. A thermal resistor element 120 is disposed so that it is exposed to the intake air. The thermal resistor element 120 is operated by the signal from a drive circuit 121, which operates in response to the control signal produced on the basis of the crank angle signal 130 by the microcomputer 110 and also receives the resistance value of the thermal resistor element 120.

Figure 5:
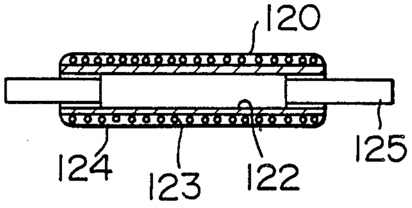
FIG. 5 is a cross-sectional view of the sensor element.

FIG. 5 shows, as an example, the structure of the thermal resistor element 120, which is a platinum wire 123 wound on a ceramic bobbin 122 and provided with a glass coating 124. The input/output signals of the thermal resistor element 120 are communicated to the platinum wire 123 through a lead wire 125. The thermal resistor element 120 may be of the type in which a platinum wire runs inside the air intake pipe, as will be described later.

Figure 1:
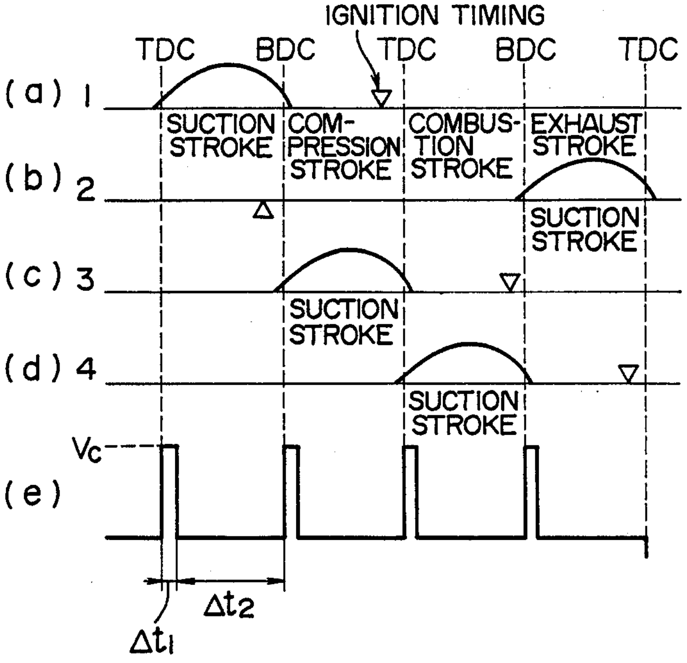
FIGS. 1 and 2 are diagrams explaining the operation of the inventive apparatus.

FIG. 1 shows on a timing chart the suction strokes (a) through (d) of the cylinders of a 4-cylinder, 4-cycle engine and the voltage Vc (e) applied to the thermal resistor element 120. The voltage Vc is applied when the suction stroke of each cylinder begins, and the voltage application is ceased on expiration of time Δt1.

Figure 2:
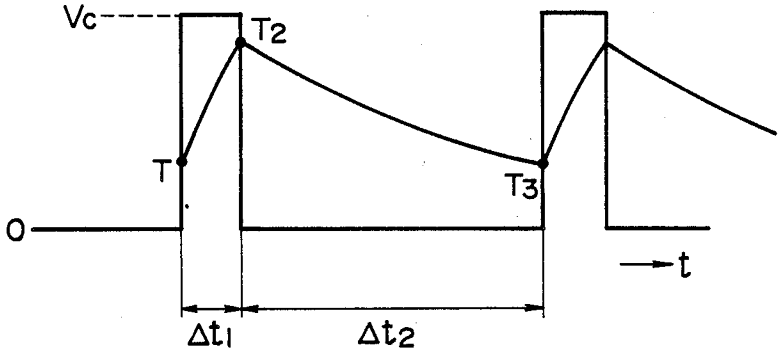

After that, the voltage is applied again in synchronism with the commencement of suction stroke of the next cylinder. The angle or time duration of no voltage application is indicated by $\Delta t2$, the voltage pulse is applied repeatedly in synchronism with the suction stroke. FIG. 2 shows the relation of the application voltage and the temperature T of the thermal resistor element 120 on the time axis. With the constant voltage Vc being applied to the resistor element 120, the temperature rises from T1 to T2. after the voltage application has been ceased, the resistor element 120 is cooled down by heat dissipation to a temperature T3. The T2 and T3 are detected in terms of the resistance variation of the resistor element 120 and their difference is calculated, and the quantity of air introduced in a suction stroke is detected.

The T2 and T3 are expressed by the formulas of heat conduction as follows.

$$T2 = Ta + (T3 - Ta)\exp\left(-\frac{\alpha}{C}\Delta t1\right) + \frac{RI^2}{\alpha}\left\{1 - \exp\left(-\frac{\alpha}{C}\cdot\Delta t1\right)\right\} \quad (1)$$

$$T3 = Ta + (T2 - Ta)\exp\left(-\frac{\alpha}{C}\Delta t2\right) \quad (2)$$

where

Ta is the intake temperature (constant over a stroke),
C is a constant (pertinent to the thermal capacity),
$\alpha$ is the heat conduction factor of air,
R is the resistance of the thermal resistance element,
I is the current flowing in the thermal resistor element,
$\Delta t1$ is the duration when the heating current is applied,
$\Delta t2$ is the duration when the heating current is not applied, and
exp( ) expresses the variation of movement of heat.

The above approximate formulas (1) and (2) have the following meaning.

T2 = <intake air temperature > + <heat dissipation during heating period due to difference between thermal resistor temperature and intake air temperature> + <applied heat> (3)

T3 = <intake air temperature> + <heat dissipation during dissipation period due to difference between thermal resistor temperature and intake air temperature> (4)

Assuming the pulsative heating period $\Delta t1$ to be sufficiently short, the applied heat during the heating period $\Delta t1$ is incomparably greater than the dissipation heat in the same period, and the second term on the right side of formula (3), i.e., the second term on the right side of formula (1), can be neglected. Therefore, the formula (1) is reduced to as follows.

$$T2 = Ta + \frac{RI^2}{\alpha}\left\{1 - \exp\left(-\frac{\alpha}{C}\Delta t1\right)\right\} \quad (5)$$

or

-continued $$T2 - Ta = \frac{RI^2}{\alpha}\left\{1 - \exp\left(-\frac{\alpha}{C}\Delta t1\right)\right\} \quad (6)$$

The formula (2) is similarly reformed as follows.

$$T3 - Ta = (T2 - Ta)\exp\left(-\frac{\alpha}{C}\Delta t2\right) \quad (7)$$

Substituting the equation (6) into (7) results as follows.

$$T3 - Ta = \frac{RI^2}{\alpha}\left[\exp\left(-\frac{\alpha}{C}\Delta t2\right) - \exp\left\{-\frac{\alpha}{C}(\Delta t1 + \Delta t2)\right\}\right] \quad (8)$$

Subtracting the equation (8) from (6) gives:

$$T2 - T3 = \frac{RI^2}{\alpha}\left[1 - \exp\left(-\frac{\alpha}{C}\Delta t1\right) - \exp\left(-\frac{\alpha}{C}\Delta t2\right) + \exp\left\{-\frac{\alpha}{C}(\Delta t1 + \Delta t2)\right\}\right] \quad (9)$$

Since the values t1 and t2 can be set arbitrarily in relation to revolution N of the engine, the only variable included in the equation (9) is the heat conduction factor $\alpha$ of air, and the equation (9) becomes a function of $\alpha$ as follows.

$$T2 - T3 = f(\alpha) \quad (10)$$

The equation is solved for $\alpha$ as follows.

$$\alpha = F(T2 - T3) \quad (11)$$

Then $\alpha$ becomes a function of T2−T3.

The $\alpha$ is given the following relation by the formula of heat conduction.

$$\alpha = A + B\sqrt{U} \quad (12)$$

where A and B are constants, and U is the flow speed. The equation (12) is reformed to the flow speed U as follows.

$$U = \left(\frac{\alpha - A}{B}\right)^2 \quad (13)$$

For the intake air path having a cross-sectional area of S, the quantity of intake air Qa is given as follows.

$$Qa = S.U \quad (14)$$

Accordingly, by known T2−T3, $\alpha$ is evaluated by equation (11). By substituting the value of $\alpha$ in equation (13), U is evaluated, and, by substituting the value of U in equation (14), Qa is calculated. The $\alpha$ in equation (11) is the function independent of the intake air temperature Ta, and consequently the quantity of intake air can be evaluated without being affected by the intake air temperature Ta.

Figure 6:
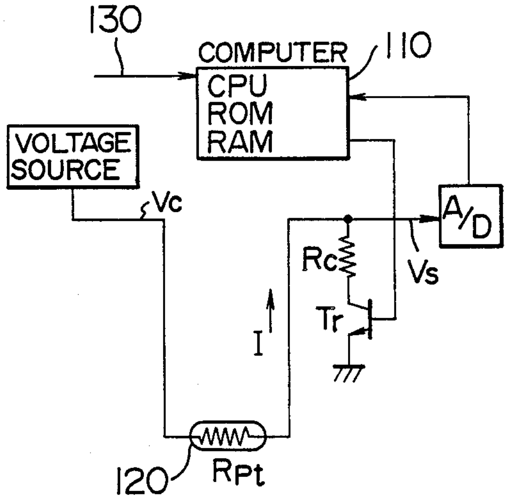
FIG. 6 is a block diagram showing an embodiment of this invention.

FIG. 6 shows an embodiment of the actual detecting system. The constant voltage Vc is switched on and off by a transistor Tr which is operated by the signal from the computer 110, so that voltage pulses are applied to the thermal resistor element 120 (with resistance Rpt) and a fixed resistor Rc as shown in FIG. 1. The voltage pulses have their period and duty cycle determined from the crank angle signal 130. The application of voltage Vc causes a current I to flow through the thermal resistor element 120 and fixed resistor Rc. To know the temperature of the thermal resistor element 120, its resistance value Rpt needs to be detected. The current I and the terminal voltage Vs on Rc at application of Vc are expressed as follows.

$$I = \frac{Vc}{Rpt + Rc} \tag{15}$$

$$Vs = Rc \cdot I = \frac{Rc}{Rpt + Rc} \cdot Vc \tag{16}$$

From equation (16), Rpt is given as follows.

$$Rpt = \frac{Vc - Vs}{Vc} \cdot Rc \tag{17}$$

Figure 7:
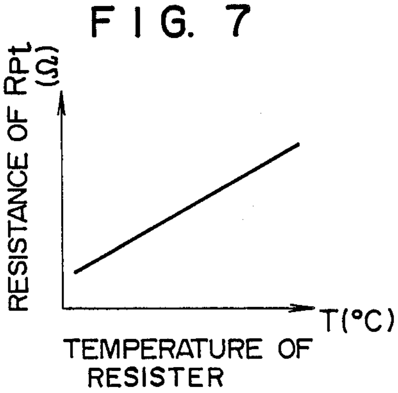
FIG. 7 is a graph showing the temperature vs. resistance characteristics of the thermal resistor element.

When the thermal resistor element 120 is made of platinum, its temperature T and resistance value Rpt are in a linear relation as shown in FIG. 7, and therefore T is obtained directly from Rpt, which is obtained from Vs using the equation (17).

Figure 8:
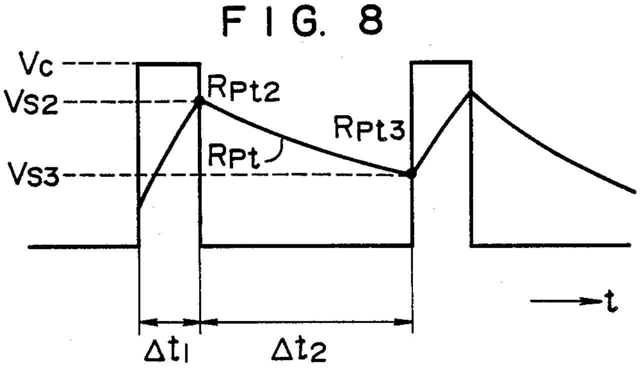
FIG. 8 is a diagram explaining the operation of the embodiment shown in FIG. 6.
Figure 9:
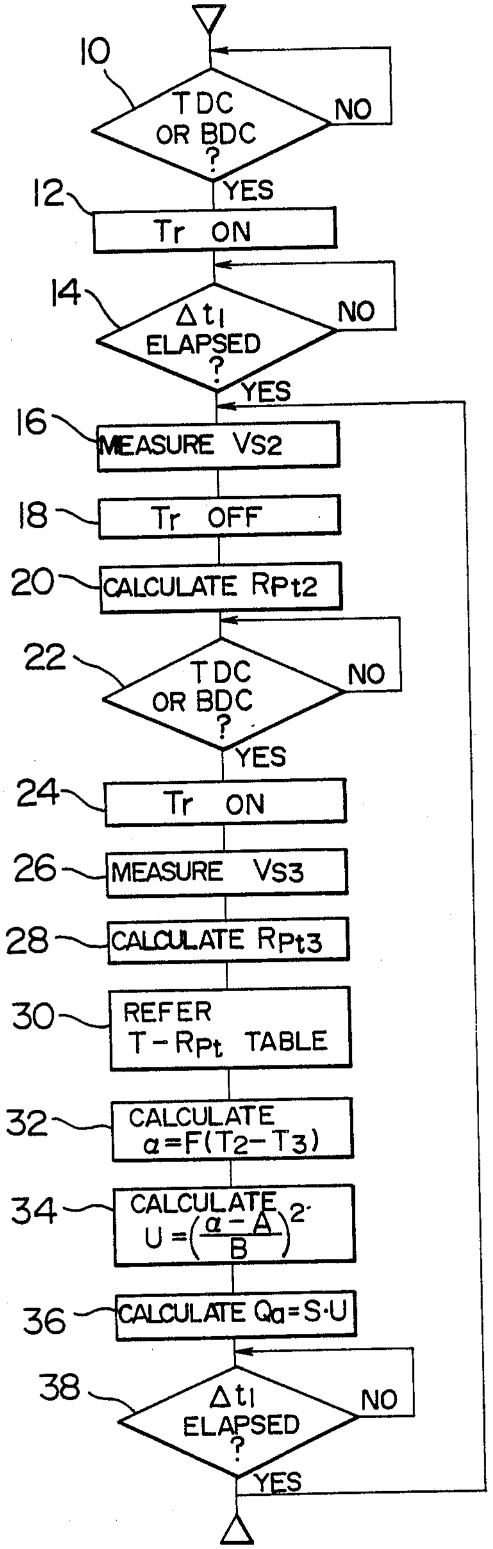
FIG. 9 is a flowchart of the operation shown in FIG. 8.
Figure 10:
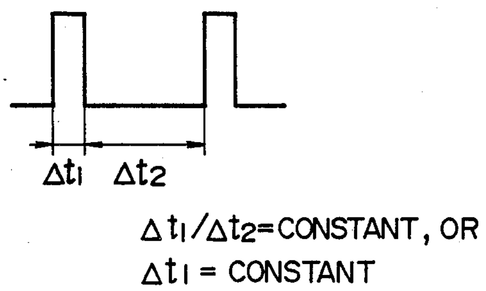
FIG. 10 is a timing chart showing the heating and heat dissipating cycle.

FIG. 8 is derived from FIG. 2, with the variation of T being replaced with the variation of Rpt. From Rpt2 and Rpt3, the corresponding T2 and T3 are obtained on FIG. 7, and the quantity of intake air Qa is calculated using equations (11), (12), (13) and (14). These operations are summarized on the flowchart of FIG. 9. The computational processes shown in FIG. 9 are carried out under control of the CPU in the computer 110 in accordance with the program stored in the ROM of the computer 110.

In step 10 and 12, after TDC (Top Dead Center) or BDC (Bottom Dead Center), the transistor Tr is turned on for a duration of Δt1. On expiration of Δt1 in the next step 14, the Vs is measured (as Vs2) in step 16, and the Tr is turned off in step 18.

The following step 20 calculates Rpt2 using the equation (17) and stores the result in a rewritable RAM of the computer 110. In the next steps 22 and 24, at TDC or BDC, the Tr is turned on again and, immediately after that, Vs3 is measured in step 26, and Rpt3 is calculated using the equation (17) in step 28. The ROM of the computer 110 has a record of the relation between the thermal resistor temperature and its resistance value shown in FIG. 7, and step 30 searches the T-Rpt table to read out temperatures T2 and T3 corresponding to the Rpt2 and Rpt3. Steps 32, 34 and 36 calculate equations (11), (13) and (14), respectively, to evaluate the Qa. On expiration of Δt1 in step 38, the Vs2 is measured again and the Tr is turned off. These operations are repeated periodically.

The heating period Δt1 is set shorter than the heat dissipating period Δt2 so as to prevent that the applied heat is not dissipated sufficiently in the heat dissipating period and it is not accumulated progressively by the cyclic operations. In this embodiment, Δt1 is set shorter than (1/2).(Δt1+Δt2). The length of the suction stroke varies in response to the variation in engine revolutions N, and accordingly Δt1+Δt2 which is in synchronism with the suction stroke also varies. One method is to control Δt1/Δt2 to be constant depending on the varying N. As another method, Δt1 may be made constant regardless of engine revolutions N, provided that the applied heat is not accumulated.

Figure 11:
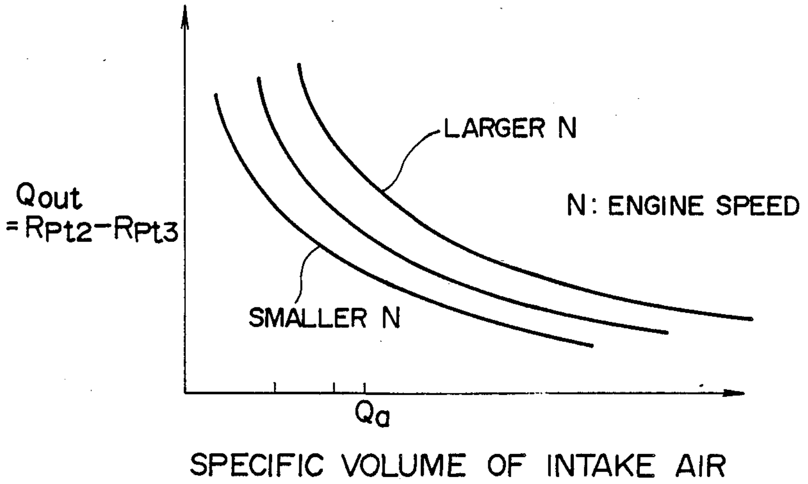
FIG. 11 is a characteristic graph based on measurement showing the relation between the value representing the temperature variation of thermal resistor element and the intake air quantity.

FIG. 11 shows the relation between the quantity of intake air Qa and the variation of resistance of thermal resistor element which corresponds to its temperature variation, with engine speed N being a parameter. This characteristic graph, based on the measurement, corresponds to the result of calculation of the equations (11), (13) and (14).

Figure 12:
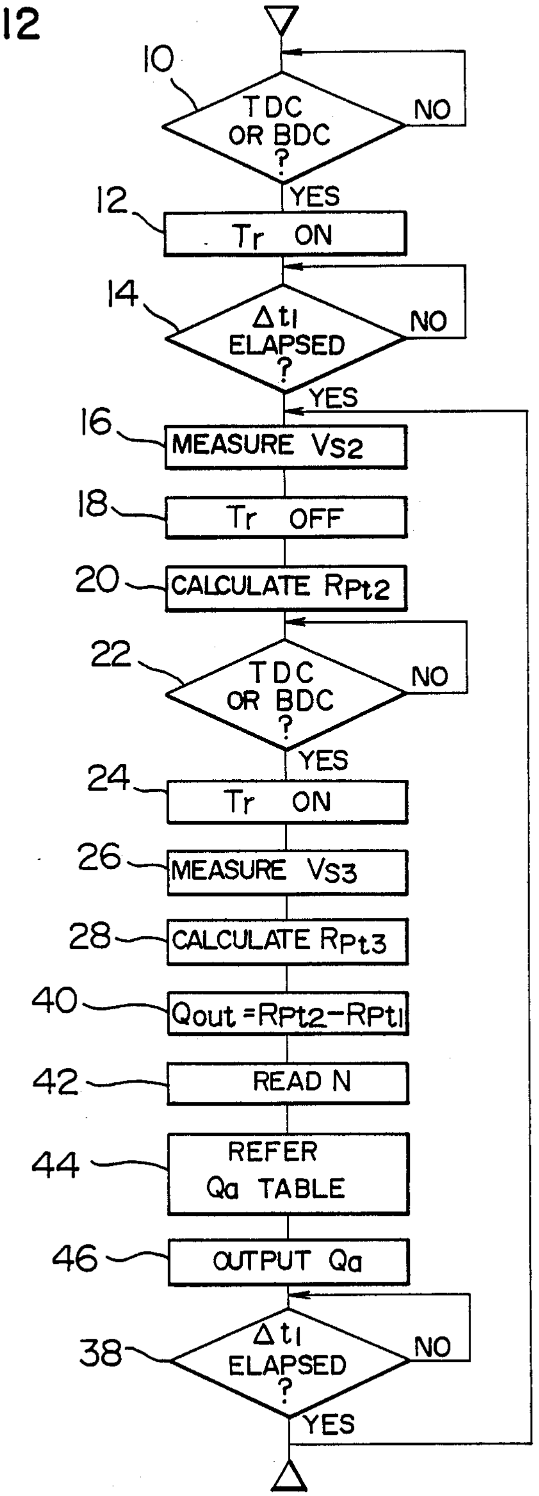
FIG. 12 is a flowchart of evaluating the intake air quantity based on FIG. 11 according to the embodiment of FIG. 6.

The computational processes shown on the flowchart of FIG. 12 are carried out under control of the CPU in the computer 110 in accordance with the program stored in the ROM of the computer 110, and the equations (11), (12) and (14) are not actually calculated as shown in the flowchart of FIG. 9, but instead the quantity of intake air Qa is obtained from the measured characteristic graph of FIG. 11. The ROM of the computer 110 stores the relation between Qout and Qa for each value of N in FIG. 11. Up to step 28, the operation is identical to the flowchart of FIG. 9. Following the calculation of Qout=Rpt2−Rpt3 in step 40, engine speed N is read in step 42, the Qout−Qa table map in ROM which is equivalent to FIG. 11 is looked up in step 44, and the quantity of intake air Qa corresponding to the calculated Qout is obtained in step 46.

Figure 13:
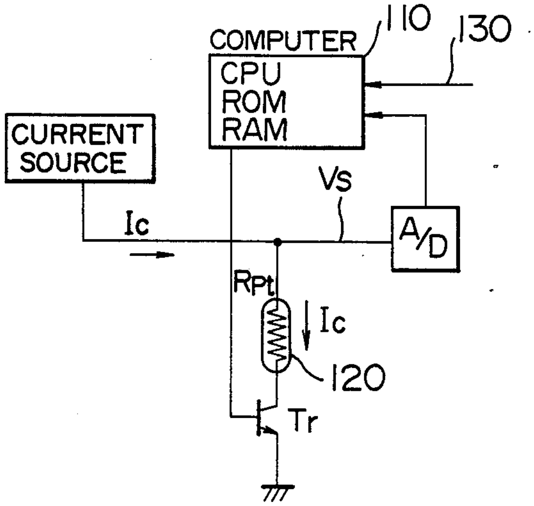
FIG. 13 is a block diagram of another embodiment of this invention.

FIG. 13 shows another embodiment for measuring the temperature T of the thermal resistor element 120. In FIG. 13, a current from a constant current source Ic flows in the thermal resistor element 120 only when the transistor Tr is on. At this time, the resistor element 120 has its terminal voltage Vs expressed as follows.

$$Vs = Ic \cdot Rpt \tag{18}$$

Figure 14:
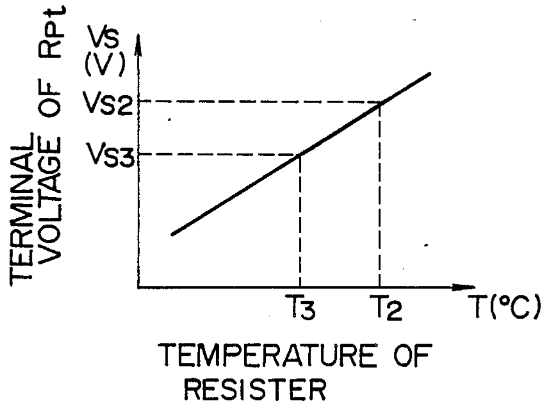
FIG. 14 is a graph showing the thermal resistor temperature vs. thermal voltage characteristics according to the embodiment of FIG. 13.

The voltage has a linear relation with the temperature T of the resistor element 120 as shown in FIG. 14. The ROM in the computer 110 stores a VS-T table map which is equivalent to FIG. 14. An A/D converter is used to monitor the terminal voltage Vs directly, and from the readout value and the Vs-T table map, the value of Qout= *Vs*2− *Vs*3 can be obtained. The embodiment of FIG. 13 does not need to calculate the resistance value of the resistor element 120, and the calculation of Rpt2 and Rpt3 in steps 20 and 28 in the flowcharts of FIGS. 9 and 12 becomes unnecessary. The computer 110 is rid of the computational operation, and the program is simplified.

Figure 15:
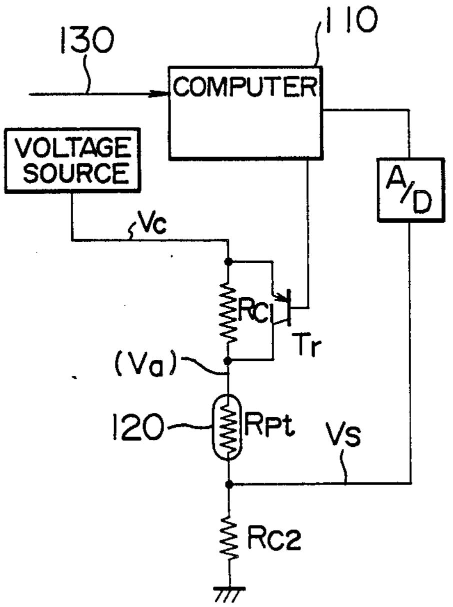
FIG. 15 is a block diagram showing a further embodiment of this invention.

FIG. 15 shows another embodiment for measuring the T2 and T3, in which Rc1 and Rc2 are fixed resistors. The terminal voltage Va of the resistor element 120 when the Tr is cut off, in which case the current flows in the resistors Rc1, Rpt and Rc2, is expressed as follows.

$$Va = \frac{Rc2 + Rpt}{Rc1 + Rc2 + Rpt} \cdot Vc \tag{19}$$

The terminal voltage Va of the resistor element 120, when the Tr is turned on, where the transistor has a very low on-state resistance, is expressed as follows.

$$Va \simeq Vc \tag{20}$$

Figure 16:
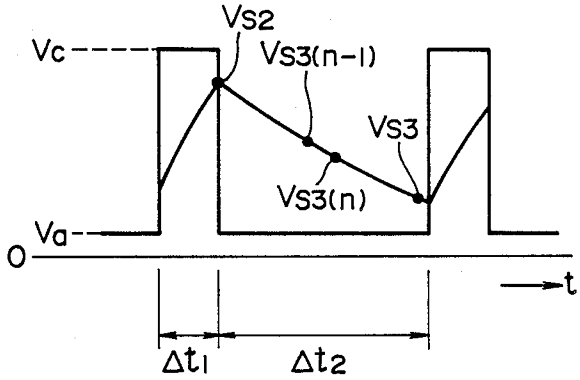
FIG. 16 is a diagram explaining the operation of the embodiment of FIG. 15.

Namely, this embodiment is designed such that a constant voltage is applied steadily, and a higher voltage is applied additionally only in the heating period, as shown in FIG. 16. In contrast to the preceding embodiments, in which the temperature measurement on expiration of the heating dissipating period $\Delta t2$ is carried out concurrently with heating, it becomes possible to monitor the signal indicative of the thermal resistor temperature uninterruptedly during the heat dissipating period. The purpose is that the detection of the temperature-indicating signal takes time relative to a very short $\Delta t1$, and it is intended to avoid the occurrence of a large error due to the delay. The operation will be described in the following. This method can be carried out by circuit arrangements other than that shown in FIG. 15, and it is also applicable to the embodiments of FIGS. 6 and 13.

Figure 17:
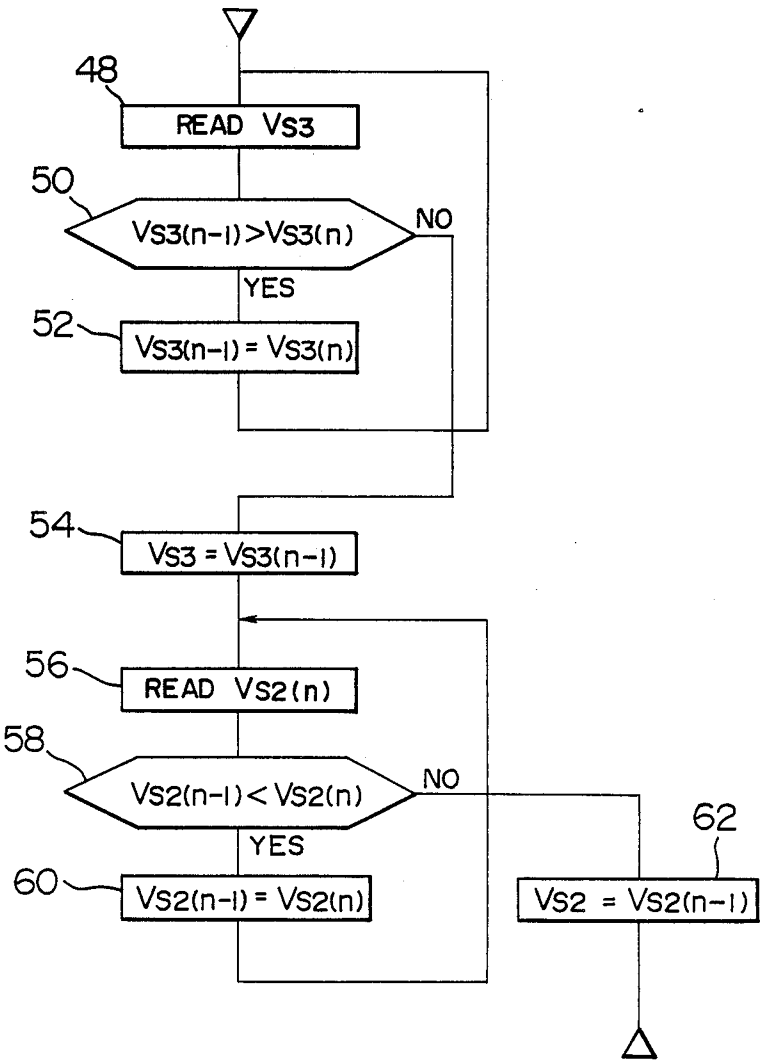
FIG. 17 is a flowchart of the operation shown in FIG. 16.

The operation of the embodiment of FIG. 15 will be described in connection with FIG. 16 and the flowchart of FIG. 17. The operation is controlled by the CPU in the computer 110. Indicated by Vs3(n−1) and Vs3(n) are terminal voltage Va of the resistor element 120 during the heat dissipating period, with subscript n implying later than n−1 on the time axis.

Step 48 reads the current value of Va for Vs3(n), and step 50 compares it with the previous value Vs3(n−1) to detect that the order of their magnitudes has reversed. If reversal has not occurred, i.e., Vs3(n−1)>Vs3(n) in the heat dissipating period, step 52 sets the current value Vs3(n) to Vs3(n−1) and reads a new value. If reversal has occurred, i.e., Vs3(n−1)<Vs3(n) indicating that heating has started, step 54 establishes the then compared value Vs3(n−1) as Vs3.

The next step 56 reads the Va after the commencement of heating, and step 58 compares it with the previous value Vs2(n−1). Unless the order of both magnitudes has reversed, i.e., Vs2(n−1)<Vs2(n) during the heating period, step 60 sets the current value Vs2(n) as Vs2(n−1) and reads a new value. At the occurrence of reversal, i.e., Vs2(n−1)>Vs2(n) indicating the end of heating period and beginning of heat dissipation, step 62 establishes the then compared value Vs2(n−1) as Vs2. Based on the values Vs2 and Vs3 established in FIG. 17, the Rpt2 and Rpt3 are evaluated in the same manner as shown in the flowchart of FIG. 12 and the Qout can be obtained.

Figure 18:
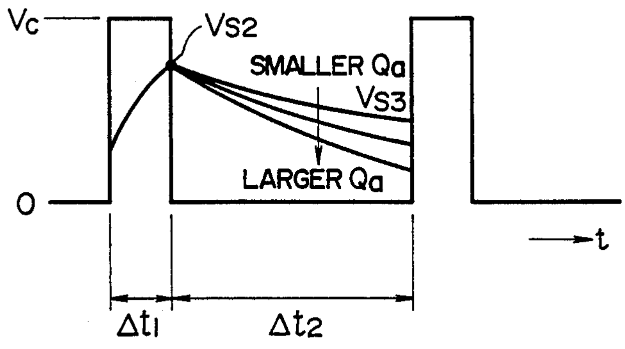
FIG. 18 is a graph showing the intake air quantity vs. thermal resistor terminal voltage characteristics.
Figure 19:
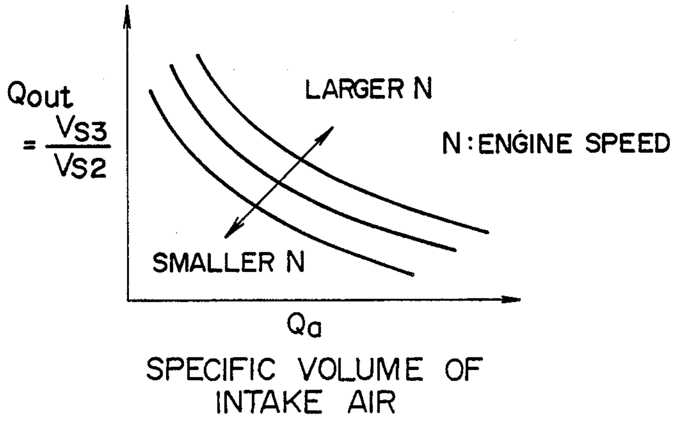
FIG. 19 is a characteristic graph based on measurement showing the relation between the thermal resistor terminal voltage ratio and the intake air quantity.

FIGS. 18 and 19 show a method of data processing for obtaining the Qout without calculating the Rpt2 and Rpt3. As shown in FIG. 18, an increase in the quantity of intake air Qa results in a falling terminal voltage Va of the resistor element 120 on expiration of the heat dissipating period. On this account, measuring the relation between the ratio of resistor element terminal voltages Vs3/Vs2 and the Qa, with engine revolutions N being a parameter, provides the Vs3/Vs2 vs. Qa characterstics as shown in FIG. 19, and this relation is stored in the ROM of the computer 110. By monitoring the terminal voltage of the resistor element 120 for Vs2 and Vs3, the steps 20 and 28 in the flowchart of FIG. 12 can be omitted. Step 30 places Vs3/Vs2 to be Qout, and step 36 loosk up the table map, which is equivalent to FIG. 19, to obtain the Qa.

The present invention is not confined to the illustrated embodiments, but various modifications ae possible within the scape of the following claims.

We claim:

1. A method of measuring the quantity of intake air of internal combustion engine on the basis of the temperature of a thermal resistor element which is supplied with an electric current, said method comprising:

(a) a first step of heating said thermal resistor element for a certain period and thereafter allowing said resistor element to dissipate heat for a certain period, in synchronism with the suction stroke of the engine;

(b) a second step of detecting a first signal indicative of the temperature at the end of the N-th (N is an arbitrary integer) heating period for said thermal resistor element;

(c) a third step of detecting a second signal indicative of the temperature at immediately before commencing the N+1-th heating for said thermal resistor element;

(d) a fourth step of detecting a value, which corresponds to a temperature variation of said thermal resistor element, from said detected first and second signals; and (e) a fifth step of determining the quantity of intake air through a computation based on said value corresponding to temperature variation.

2. An intake air quantity measuring method according to claim 1, wherein said second and third steps each include a step of obtaining a resistance value of said resistor element corresponding to a temperature of said resistor element, and wherein said fourth step includes a step of detecting the difference of resistance values of said thermal resistor element as said value corresponding to temperature variation.

3. An intake air quantity measuring method according to claim 1, wherein said second and third steps each include a step of detecting a voltage drop of said thermal resistor element as a signal indicative of a temperature of said thermal resistor element, and wherein said fourth step includes a step of detecting the difference of voltage drops of said thermal resistor element as said value corresponding to temperature variation.

4. An intake air quantity measuring method according to claim 3, wherein said fourth step includes a step of detecting the ratio of voltage drops of said thermal resistor element as said value corresponding to temperature variation.

5. An intake air quantity measuring method according to claim 3 or 4, wherein in said first step the current supply to said thermal resistor element is suspended during said heat dissipating period.

6. An intake air quantity measuring method according to claim 5, wherein in said first step said heating period is shorter than said heat dissipating period.

7. An intake air quantity measuring method according to claim 6, wherein in said first step said heating period is shorter than half the sum of said heating period and said heat dissipating period.

8. An intake air quantity measuring method according to claim 3 or 4, wherein in said first step a current is supplied to said thermal resistor element during said heat dissipating period.

9. An intake air quantity measuring method according to claim 8, wherein in said first step said heating period is shorter than said heat dissipating period.

10. An intake air quantity measuring method according to claim 9, wherein in said first step said heating period is shorter than half the sum of said heating period and said heat dissipating period.

11. An intake air quantity measuring method according to claim 1, wherein said fifth step includes a step of calculating the heat conduction factor of intake air from said value corresponding to temperature variation, calculating the flow speed of intake air from said heat conduction fctor, and calculating the quantity of intake air from said flow speed and the area of the intake air path.

12. An intake air quantity measuring method according to claim 11, wherein said engine is controlled by a computer, and wherein said fifth step includes a step of calculating the heat conducting factor from said value corresponding to temperature variation, calculating the flow speed from said heat conduction factor, and programming for said computer, in advance, a sequence of calculating the intake air quantity from said flow speed in the form of a map which indicates the relation between said value corresponding to temperature variation and the intake air quantity, and a step of reading, upon detecting a value corresponding to temperature variation, the intake air quantity corresponding to said detected value out of said map.

13. An intake air quantity measuring method according to any one of claims 1 through 4, 11 and 12, wherein in said first step said heating period is shorter than said heat dissipating period.

14. An intake air quantity measuring method according to claim 13, wherein in said first step said heating period is shorter than half the sum of said heating period and said heat dissipating period.

15. An apparatus for measuring the quantity of intake air of an internal combustion engine on the basis of the temperature of a thermal resistor element which is supplied with an electric current, said apparatus comprising:

(a) first means of heating said thermal resistor element for a certain period and thereafter allowing said resistor element to dissipate heat for a certain period, in synchronism with the suction stroke of the engine;

(b) second means of detecting a first signal indicative of the temperature at the end of the N-th (N is an arbitrary integer) heating period for said thermal resistor element;

(c) third means for detecting a second signal indicative of the temperature at immediately before commencing the N+1-th heating for said thermal resistor element;

(d) fourth means of detecting a value, which corresponds to a temperature variation of said thermal resistor element, from said detected first and second signals; and (f) fifth means of determining the quantity of intake air through a computation based on said value corresponding to temperature variation.

16. An intake air quantity measuring apparatus according to claim 15, wherein said second and third means each include means of obtaining a resistance value of said resistor element corresponding to a temperature of said resistor element, and wherein said fourth means includes means of detecting the difference of resistance values of said thermal resistor element as said value corresponding to temperature variation.

17. An intake air quantity measuring apparatus according to claim 15, wherein said second and third means each include means of detecting a voltage drop of said thermal resistor element as a signal indicative of a temperature of said thermal resistor element, and wherein said fourth means includes means of detecting the difference of voltage drops of said thermal resistor element as said value corresponding to temperature variation.

18. An intake air quantity measuring apparatus according to claim 17, wherein said fourth means include means of detecting the ratio of said voltage drops of said thermal resistor element as said value corresponding to temperature variation.

19. An intake air quantity measuring apparatus according to claim 17 or 18, wherein said first means suspends the current supply to said thermal resistor element during said heat dissipating period.

20. An intake air quantity measuring apparatus according to claim 19, wherein in said first means said heating period is shorter than said heat dissipating period.

21. An intake air quantity measuring apparatus according to claim 20, wherein in said first means said heating period is shorter than half the sum of said heating period and said heat dissipating period.

22. An intake air quantity measuring apparatus according to claim 17 or 18, wherein said first means includes means of supplying a current to said resistor element during said heat dissipating period.

23. An intake air quantity measuring apparatus according to claim 22, wherein in said first means said heating period is shorter than said heat dissipating period.

24. An intake air quantity measuring apparatus according to claim 23, wherein in said first means said heating period is shorter than half the sum of said heating period and said heat dissipating period.

25. An intake air quantity measuring apparatus according to claim 15, wherein said fifth means includes means of calculating the heat conduction factor of intake air from said value corresponding to temperature variation, calculating the flow speed of intake air from said heat conduction factor, and calculating the quantity of intake air from said flow speed and the area of the intake air path.

26. An intake air quantity measuring apparatus according to claim 25, wherein said engine includes a computer, and wherein said fifth means includes means of calculating the heat conduction factor from said value corresponding to temperature variation and calculating the flow speed from said heat conduction factor, a map programmed for said computer, in advance, a sequence of calculating the intake air quantity from said flow speed in the form of relation between said value corresponding to temperature variation and the intake air quantity, and means of reading, upon detecting a value corresponding to temperature variation, the intake air quantity corresponding to said detected value out of said map.

27. An intake air quantity measuring apparatus according to any one of claims 15 through 18, 25 and 26, wherein in said first means said heating period is shorter than said heat dissipating period.

28. An intake air quantity measuring apparatus according to claim 27, wherein in said first means said heating period is shorter than half the sum of said heating period and said heat dissipating period.

* * * * *